US005600081A

United States Patent [19]

Simjian

[11] Patent Number: 5,600,081

[45] Date of Patent: Feb. 4, 1997

[54] METHOD OF IMPROVING THE SONORITY OF A MUSICAL INSTRUMENT

[76] Inventor: Luther G. Simjian, 1750 S. Ocean La., Ft. Lauderdale, Fla. 33316

[21] Appl. No.: 539,327

[22] Filed: Oct. 4, 1995

[51] Int. Cl.[6] .......... G01D 3/02

[52] U.S. Cl. .......... 84/453; 84/294

[58] Field of Search .......... 84/453, 454, 294

[56] References Cited

U.S. PATENT DOCUMENTS

| | | | |
|---|---|---|---|
| 2,911,872 | 11/1959 | Carl | 84/173 |
| 3,796,122 | 3/1974 | Kaminsky | 84/173 |
| 5,537,908 | 7/1996 | Rabe et al. | 84/454 |

*Primary Examiner*—Michael L. Gellner
*Assistant Examiner*—Shihyung Hsieh

[57] ABSTRACT

To improve the sonority of a musical instrument which is made at least in part of wood, the wood before becoming a part of the instrument is subjected to sonic energy for causing surface erosion as a result of cavitation. The wood, usually a panel, preferably is treated when it is in its substantially final shape, but devoid of a surface coating. A liquid, such as water, comprises the coupling means between the source of sonic energy and the wood, and the frequency of the sonic energy, suitably, is in the range between 5 kHz and 100 kHz.

12 Claims, 1 Drawing Sheet

METHOD OF IMPROVING THE SONORITY OF A MUSICAL INSTRUMENT

BRIEF SUMMARY

This invention relates to the treatment of wood by sonic energy in order to improve the sonority of musical instruments made from such treated wood. The invention is particularly applicable to string instruments, such as violins, violas, cellos, etc.

In my previously issued U.S. Pat. No. 2,806,246 I have disclosed the treatment of meat by sonic or ultrasonic energy in order to achieve tenderization. Tests conducted have evidenced that such tenderization occurs, although commercial use of the process has been hampered by economic factors associated with this process.

The present invention proposes to subject wood panels to the effect of sonic or ultrasonic energy, typically a frequency in the range between 5 kHz and 100 kHz, in order to provide as a result of surface cavitation microscopic surface irregularities, which, among other benefits, contribute to improved adherence of the lacquer layer which serves as the surface finish. It is believed that greater sonority will be achieved, thereby enhancing the musical quality. Most. conveniently, the exposure to sonic energy is achieved by immersing the wood panel in a liquid, such as water, which serves as the coupling means between the source of energy and the wood panel.

In an alternative arrangement, a screen is disposed between the source and the panel to vary the surface texture of the panel.

One of the principal objects of this invention is the provision of a method for improving the sonority of musical instruments made entirely or partially of wood.

Another important object of this invention is the provision of a method of treating wood by sonic energy prior to such wood becoming a part of a musical instrument.

Another important object of this invention is the provision of a method of treating the surface of a wood panel by sonic energy in order to alter the surface texture of the panel and then using the panel as a part of a musical instrument.

A further important object of this invention is the provision of a method for texturing the surface of a wood panel by sonic energy operating at a frequency in the range between 5 kHz and 100 kHz and then using the panel as a part of a musical instrument.

Still further and other objects of this invention will become more clearly apparent from the following description when taken in conjunction with the accompanying drawings.

DETAILED DESCRIPTION

Figure 1:
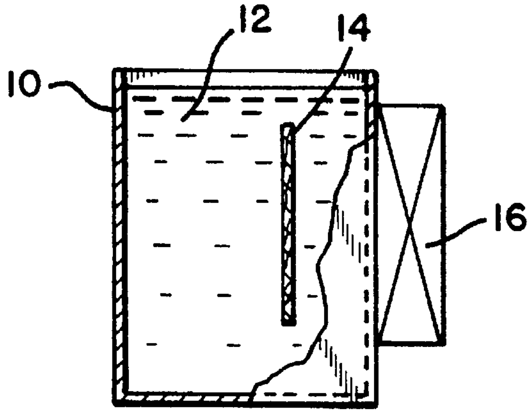
FIG. 1 is a schematic elevational view of my invention.

Referring now to the figures and FIG. 1 in particular, a tank 10 is filled with a liquid 12, such as water, and contains a piece of wood 14 which is shaped substantially to its final form of a musical instrument of which it will form a part, such as a violin, but still being devoid of its final finish, such as one or more coatings of lacquer. Electroacoustic transducers 16 coupled to an electric high frequency generator, not shown, are mounted to a side wall of the tank 10 and, when energized, propagate sonic energy toward the surface of the wood panel 14 for causing cavitation thereat, thereby effecting surface erosion, i.e. tiny irregularities. The frequency of the sonic energy suitably is between 5 kHz and 100 kHz, but more suitably between 5 kHz and 40 kHz. It is believed that the surface irregularities, among other benefits, enhance adhesion of the surface finish, providing improved sonority.

Figure 2:
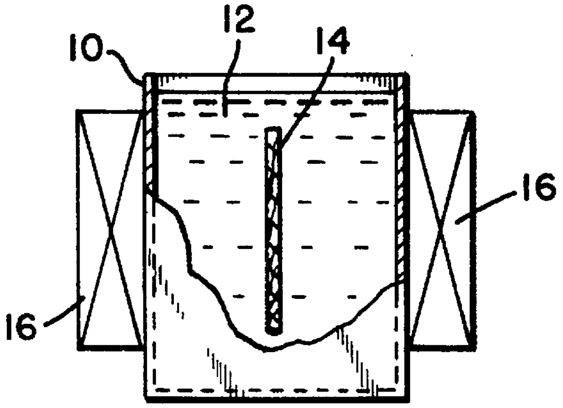
FIG. 2 is a schematic elevational view of an alternative embodiment.

In FIG. 2 a substantially identical arrangement is shown, except that two opposite sides of the panel 16 are treated simultaneously with sonic energy, using transducers mounted at two tank walls. Alternatively, with reference to FIG. 1, the two panel sides can be treated consecutively using only a single source of sonic energy.

Figure 3:
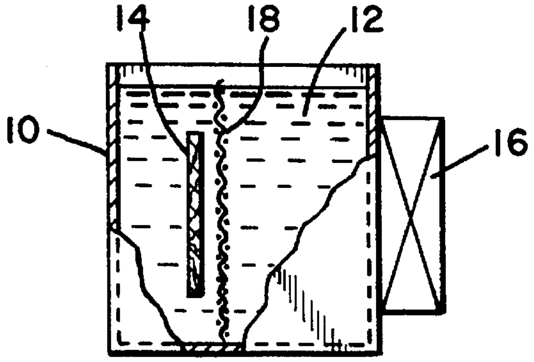
FIG. 3 is a schematic elevational view of a further alternative embodiment.

FIG. 3 shows an arrangement wherein a screen 18, typically a metal screen is interposed between the source of sonic energy 16 and the wood panel 14 to provide a discontinuous surface pattern. In a further alternative arrangement, the treated surface portion can be alternated with an untreated portion by masking portions which are to be left untreated.

While it is simpler to carry out the treatment at room temperature, it may be found advantageous for enhanced results to carry out the treatment at a temperature just above the freezing temperature of the coupling liquid, in the case of brine a temperature below 0° C.

Figure 4:
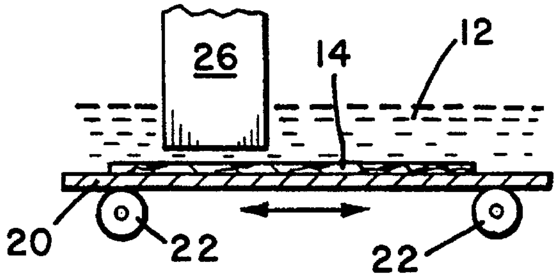
FIG. 4 is a schematic elevational view of a still further alternative embodiment of my invention.

A still further embodiment is depicted in FIG. 4. The wood panel 14 is treated in the "near field" of the sonic energy. As illustrated, the panel 14 rests on a support plate or band 20 which is movable horizontally by means of rollers 22. Sonic energy is provided by a solid horn 26 which couples sonic energy to the wood panel via a comparatively thin film of coupling liquid 12. For treating an extended surface of the panel, i.e. the panel surface greatly exceeds the frontal surface of the horn, the panel is moved relative to the stationary horn. It will be apparent to those skilled in the art that alternatively an array of horns can be provided to produce a larger sonic energy radiating surface.

While there have been described and illustrated certain preferred embodiments of my invention and still further embodiments have been indicated, it will be apparent to those skilled in the art that various additional changes and modifications may be made without deviating from the broad principle of this invention, which shall be limited only by the scope of the appended claims.

What is claimed is:

1. The method of improving the sonority of a musical instrument made at least partially of wood comprising the steps of:

providing a source of sonic energy and exposing at least one surface of the wood prior to its incorporation in the instrument to sonic energy propagated from said source operating at a frequency in the range from 5 kHz to 100 kHz.

2. The method of improving the sonority of a musical instrument as set forth in claim 1, and coupling the sonic energy from said source to said wood using a liquid.

3. The method of improving the sonority of a musical instrument as set forth in claim 2, said liquid being water.

4. The method of improving the sonority of a musical instrument as set forth in claim 2, said liquid being a brine at a temperature below 0° C.

5. The method of improving the sonority of a musical instrument as set forth in claim 2, said wood being a panel.

6. The method of improving the sonority of a musical instrument as set forth in claim 5, and exposing two opposite sides of said panel to the sonic energy.

7. The method of improving the sonority of a musical instrument as set forth in claim 2, and interposing a screen between said source and said wood.

8. The method of improving the sonority of a musical instrument as set forth in claim 1, said surface being devoid of any surface coating.

9. The method of improving the sonority of a musical instrument as set forth in claim 1, said source of sonic energy comprising a solid horn.

10. The method of improving the sonority of a musical instrument as set forth in claim 2, said wood being disposed in a tank containing said liquid, and said source of sonic energy comprising electroacoustic transducer means mounted to a wall of said tank.

11. The method of improving the sonority of a musical instrument as set forth in claim 9, and providing relative motion between said horn and said wood.

12. The method of improving the sonority of a musical instrument as set forth in claim 2, said wood being disposed in a tank containing said liquid.

* * * * *